United States Patent
Kouno et al.

(10) Patent No.: US 6,868,294 B2
(45) Date of Patent: Mar. 15, 2005

(54) FEEDBACK CONTROL METHOD IN V-SHAPED CHARACTERISTIC SYSTEM, AND $NH_3$ INJECTION RATE CONTROL METHOD FOR $NO_X$ REMOVAL APPARATUS USING THE SAME

(75) Inventors: Susumu Kouno, Hiroshima-ken (JP);
Kenji Suzuki, Hiroshima-ken (JP);
Kazuko Takeshita, Hiroshima-ken (JP);
Kozo Iida, Hiroshima-ken (JP);
Toshiyuki Onishi, Nagasaki-ken (JP);
Akira Hattori, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 45 days.

(21) Appl. No.: 10/337,828

(22) Filed: Jan. 8, 2003

(65) Prior Publication Data

US 2003/0145601 A1 Aug. 7, 2003

(30) Foreign Application Priority Data

Feb. 7, 2002 (JP) ........................................ 2002-031363

(51) Int. Cl.$^7$ ............................................. G05B 13/02
(52) U.S. Cl. ............................. 700/46; 700/44; 700/45; 700/74; 700/282; 423/210; 423/212; 423/235
(58) Field of Search ............................. 700/44, 45, 46, 700/74, 282; 423/210, 212, 235

(56) References Cited

U.S. PATENT DOCUMENTS 4,168,683 A * 9/1979 Hata et al. .................. 123/704
6,119,448 A    9/2000 Emmerling et al.
6,203,770 B1 * 3/2001 Peter-Hoblyn et al. ...... 423/212
6,343,468 B1    2/2002 Doelling et al.
6,348,178 B1 * 2/2002 Sudduth et al. ............. 423/235
6,682,709 B2 * 1/2004 Sudduth et al. ............. 423/235

FOREIGN PATENT DOCUMENTS

| DE | 196 46 646 | 5/1998 | |
|----|---|---|---|
| EP | 1334760 A2 * | 8/2003 | .......... B01D/53/79 |
| JP | 63044924 A * | 2/1988 | .......... B01D/53/36 |
| JP | 02063524 A * | 3/1990 | .......... B01D/53/34 |
| JP | 8-168639 | 7/1996 | |
| JP | 9-34858 | 2/1997 | |
| JP | 2001-198438 | 7/2001 | |

* cited by examiner

*Primary Examiner*—Ramesh Patel
(74) *Attorney, Agent, or Firm*—Oblon, Spivak, McClelland, Maier & Neustadt, P.C.

(57) ABSTRACT

In the $NH_3$ injection rate control method for an $NO_x$ removal apparatus, operating area of the apparatus is divided into first area in which molar ratio of $NH_3$ injection rate with respect to $NO_x$ flow rate at an inlet of the apparatus is smaller than molar ratio at minimum point where $NO_x$ concentration assumes minimum value and second area in which the molar ratio is equal to or larger than the minimum point molar ratio, and virtual $NO_x$ concentration with respect to the molar ratio is set according to virtual characteristic line which varies monotonically to stride across desired operating point without rising with increase of the molar ratio from the first area to the second area. Moreover, feedback control is implemented for adjusting the $NH_3$ injection rate with respect to the $NO_x$ flow rate in direction that the virtual $NO_x$ concentration is brought close to the desired $NO_x$ concentration.

13 Claims, 6 Drawing Sheets

FEEDBACK CONTROL METHOD IN V-SHAPED CHARACTERISTIC SYSTEM, AND NH₃ INJECTION RATE CONTROL METHOD FOR $NO_x$ REMOVAL APPARATUS USING THE SAME

BACKGROUND OF THE INVENTION

1) Field of the Invention

The present invention relates to an $NO_x$ removal apparatus for the removal of $NO_x$ in an exhaust gas, and more particularly to a technique for control of an $NH_3$ injection rate (quantity) in an $NO_x$ removal apparatus in which the correlation between a molar ratio of an $NH_3$ injection rate into an $NO_x$ removal apparatus with respect to a flow rate of $NO_x$ at an inlet of the $NO_x$ removal apparatus and an $NO_x$ concentration at an outlet of the $NO_x$ removal apparatus produces a V-shaped curve having a downwardly protrusive (arcuate) configuration on a plane in which a molar ratio and an $NO_x$ concentration are expressed as X-Y coordinates.

2) Description of the Related Art

At an exhaust passage of a combustion facility (gas turbine or the like) such as a thermal power plant, an $NO_x$ removal apparatus is provided with a view to removing $NO_x$ in an exhaust gas. The $NO_x$ removal apparatus is designed to reduce the $NO_x$ concentration in an exhaust gas by carrying out the reaction of $NH_3$ to $NO_x$ on a catalyst (produced with an $NO_x$ removal catalyst, an $NH_3$ decomposition catalyst, and others) for decomposing the $NO_x$, together with the $NH_3$, into oxygen, water and nitrogen. In the $NO_x$ removal apparatus, the removal efficiency ($NO_x$ removal efficiency) of $NO_x$ depends upon the injection rate of $NH_3$; therefore, the control of the $NH_3$ injection rate is essential in the operation of the $NO_x$ removal apparatus.

So far, as a common $NH_3$ injection rate control method for use in an $NO_x$ removal apparatus, there has known a method based on a combination of feedforward control and feedback control. In the feedforward control, a molar ratio (=an $NH_3$ injection rate/an $NO_x$ flow rate) of an $NH_3$ injection rate to an $NO_x$ flow rate at an inlet is set in advance in accordance with a desired (target) $NO_x$ removal efficiency (=a desired $NO_x$ concentration at an outlet of an $NO_x$ removal apparatus/ an $NO_x$ concentration at an inlet of the $NO_x$ removal apparatus), and a required $NH_3$ injection rate is obtained on the basis of the product of this molar ratio and an inlet $NO_x$ flow rate (=an inlet $NO_x$ concentration×an exhaust gas flow rate), with the corresponding signal being corrected with a load change signal or the like. On the other hand, in the case of the feedback control, an $NH_3$ injection rate set according to the feedforward control is corrected on the basis of a deviation between a desired $NO_x$ concentration at an outlet of an $NO_x$ removal apparatus and an actual $NO_x$ concentration detected. For these feedforward control and feedback control, various improved control methods have been proposed (for example, see Japanese Patent Laid-Open Nos. HEI 8-168639 and 9-38458, and Japanese Patent Laid-Open No. 2001-198438).

Meanwhile, depending upon the property of an $NO_x$ removal apparatus, the relationship between an molar ratio of an $NH_3$ injection rate to an $NO_x$ flow rate at an inlet of the $NO_x$ removal apparatus and an $NO_x$ concentration at an outlet of the $NO_x$ removal apparatus can show a V-shaped characteristic having a downwardly protrusive configuration as shown in FIG. 6. In this case, a point at which a minimum value appears will be referred to as a minimum point. The reason that the $NO_x$ concentration increases conversely when the $NH_3/NO_x$ molar ratio increases in some degree as shown in FIG. 6 is that the $NO_x$ removal is composed of not only an $NO_x$ removal catalyst creating an $NO_x$ reduction reaction mainly expressed by the following reaction formulas (a) to (c) but also an $NH_3$ decomposition catalyst creating an $NH_3$ decomposition reaction mainly expressed by the following reaction formulas (d) to (e).

   (a)

   (b)

   (c)

   (d)

   (e)

When the characteristic of the outlet $NO_x$ concentration with respect to the $NH_3/NO_x$ molar ratio in the $NO_x$ removal apparatus assumes a V-shaped characteristic as mentioned above, operating points on a characteristic curve corresponding to a desired value SV of an outlet $NO_x$ concentration appear at two points P1 and P2 so that the solutions for the $NH_3$ injection rate corresponding to the desired value SV are two in number. On the other hand, as shown by two-dot chain lines in FIG. 6, a leakage $NH_3$ quantity (a residual $NH_3$ quantity at an outlet of the $NO_x$ removal apparatus) increases monotonically with an increase in the $NH_3/NO_x$ molar ratio. Accordingly, in comparison between the operating points P1 and P2 providing the same desired outlet $NO_x$ concentration SV, the operation at the operating point P1 on the left side (on the side where the $NH_3/NO_x$ molar ratio is smaller) with respect to the minimum point P0 suppresses the useless consumption of $NH_3$ more than the other to reduce the running cost and reduces the load on the environment. That is, in the $NO_x$ removal apparatus having this V-shaped characteristic, the operating point P1 existing in the left side area with respect to the minimum point P0 is an optimum operating point which is capable of minimizing the $NH_3$ consumption and of controlling the outlet $NO_x$ concentration to a prescribed value.

However, in the case of such a V-shaped characteristic curve, since the sign of the inclination of the input/output characteristic changes with respect to the minimum point P0, if the feedback control is simply implemented in accordance with the deviation between the desired $NO_x$ concentration SV and the actual $NO_x$ concentration as done in the conventional technique, the operating point diverges from the desired operating point P1, which can cause an uncontrollable condition.

SUMMARY OF THE INVENTION

The present invention has been developed with a view to eliminating the above-mentioned problems, and it is therefore an object of the invention to provide a stable feedback control technique for use in a V-shaped characteristic system (a system in which the correlation between input/output values shows a V-shaped characteristic curve having one minimum point on a plane where the input/output values are put in the form of X-Y coordinates) in which two input values can exist with respect to one output value, and further to provide an $NH_3$ injection rate control technique for use in an $NO_x$ removal apparatus capable of suppressing the $NO_x$ concentration to below a desired (target) concentration with a minimum $NH_3$ injection rate by utilizing the feedback control technique for the V-shaped characteristic system.

A description will be given hereinbelow of the outline of a feedback control method in a V-shaped characteristic system according to the present invention.

First of all, an operating area of the system is divided into a first area in which a deviation an input value and an input value at a minimum point assumes a specific sign (plus or minus) and a second area assuming a sign different from the aforesaid specific sign. An output value and an input value at the minimum point are obtained previously through experiments or design calculations to be already known values. When the specific sign is set at plus, a desired operating point providing a desired output value exists on the positive side with respect to the minimum point in an X-axis direction. On the other hand, when the specific sign is set at minus, the desired operating point offering the desired output value exists on the negative side with respect to the minimum point in the X-axis direction.

Furthermore, a virtual output value to an input value is set according to a virtual characteristic line varying monotonically to stride across the desired operating point in a state where the inclination of an output value with respect to an input value in the first area and the inclination of an output value to an input value in the second area do not differ in sign from each other. Still furthermore, the input value is changed on the basis of the deviation between the desired output value and the virtual output value in a direction that the virtual output value is brought closer to the desired output value.

With this feedback control method, since the feedback control is implemented according to the virtual characteristic line which has no minimum point and varies monotonically, the operating point can stably reach a point in the vicinity of a desired operating point.

The above-mentioned feedback control method can be implemented through the use of a control unit having the following configuration. This control unit is a control unit of a V-shaped characteristic system in which the correlation between input and output values shows a V-shaped characteristic curve having one minimum point on a plane where input and output values are put in the form of X-Y coordinates, and is composed of detecting means for an output value from the system, inputting means for inputting an input value to the system, virtual output value setting means and feedback control means.

The virtual output value setting means has a function to set a virtual output value with respect to an input value according to a virtual characteristic line which varies monotonically to stride across a desired operating point in a state where, when an operating area of the system is divided into a first area where a deviation between an input value and an input value at a minimum point has a specific sign and a second area having s sign different from the specific sign, the inclination of an output value with respect to an input value in the first area and the inclination of an output value to an input value in the second area do not differ in sign from each other. The feedback control means provides a function to change an input value in accordance with a deviation between a desired output value and a virtual output value in a direction that the virtual output value approaches the desired output value.

This control unit can implement the above-mentioned feedback control method through the use of the automatic control to be executed in cooperation with the detecting means, the inputting means, the virtual output value setting means and the feedback control means. In this connection, the control unit can also realize the feedback control method in a manner that a computer forming a hardware reads and executes a program functioning as the aforesaid detecting means, inputting means, virtual output value setting means and feedback control means. This program can be provided in the form stored in a computer-readable recording medium.

The feedback control method described above is applicable to the control of an $NH_3$ injection rate for an $NO_x$ removal apparatus in which the correlation between a molar ratio of an $NH_3$ injection rate into the $NO_x$ removal apparatus with respect to an $NO_x$ flow rate at an inlet of the $NO_x$ removal apparatus and an $NO_x$ concentration at an outlet of the $NO_x$ removal apparatus shows a V-shaped characteristic curve having a downwardly protrusive configuration on a plane in which molar ratios and $NO_x$ concentrations are expressed as X-Y coordinates.

A description will be given hereinbelow of the outline of an $NH_3$ injection rate control method according to the present invention.

First of all, an operating area of an $NO_x$ removal apparatus is divided into a first area in which a molar ratio is smaller than a molar ratio at a minimum point where the $NO_x$ concentration assumes a minimum value and a second area other than this first area. Also in this case, the $NO_x$ concentration and molar ratio at the minimum point are obtained previously as known values through experiments or design calculations.

Subsequently, a virtual $NO_x$ concentration to as molar ratio is set according to a virtual characteristic line which varies monotonically to stride across a desired operating point without increasing with respect to an increase in molar ratio from the first area to the second area. Moreover, the feedback control is implemented to adjust the $NH_3$ injection rate with respect to an $NO_x$ flow rate on the basis of a deviation between the desired $NO_x$ concentration and the virtual $NO_x$ concentration in a direction that bringing a virtual $NO_x$ concentration close to a desired $NO_x$ concentration.

With this $NH_3$ injection rate control method, since the feedback control can be done according to a virtual characteristic line which varies monotonically without having a minimum point, the operating point can converge stably to the vicinity of a desired operating point. Moreover, in this $NH_3$ injection rate control method, since the operating point is set at a desired operating point so that the $NO_x$ concentration becomes a desired $NO_x$ concentration in a smaller side area than the minimum point, it is possible to suppress the $NO_x$ concentration to below a predetermined desired $NO_x$ concentration with a minimum $NH_3$ injection rate. Accordingly, this can hold the $NH_3$ consumption down to reduce the running cost and further keeps the leakage $NH_3$ quantity down to a minute quantity.

Preferably, in a right-hand area from a desired operating point, the virtual $NO_x$ concentration is set at a value obtained by offsetting from the desired $NO_x$ concentration by a predetermined quantity to the minus side. Since predetermined deviation occurs between the desired $NO_x$ concentration and the virtual $NO_x$ concentration at all times and this deviation is in a non-decreasing condition with respect to an increase in molar ratio, even with this simple setting method, the $NH_3$ injection rate can be controlled in accordance with the deviation to bring the virtual $NO_x$ concentration close to the desired $NO_x$ concentration, thus enabling the actual $NO_x$ concentration to converge to the vicinity of the desired $NO_x$ concentration.

More preferably, in the first area, the virtual $NO_x$ concentration is set at a greater one of a value obtained by offsetting from the desired $NO_x$ concentration by a predetermined quantity to the minus side and the $NO_x$ concentration, and in the second area, the virtual $NO_x$ concentration is set at a smaller one of a value obtained by offsetting from the desired $NO_x$ concentration by a predetermined quantity to the minus side and an inverted value of the $NO_x$ concentration with respect to the desired $NO_x$ concentration. In the second area, the $NO_x$ concentration increase with an increase in molar ratio and, conversely, the aforesaid inverted value decreases with the increase in molar ratio. Accordingly, with this setting method, when the molar ratio becomes relatively high to deviate greatly from the molar ratio corresponding to the desired $NO_x$ concentration, the inverted value becomes the virtual $NO_x$ concentration to increase the deviation from the desired $NO_x$ concentration and, therefore, the quantity for adjustment of the $NH_3$ injection rate to be set in accordance with the deviation can be set at a larger value, thereby enabling the operating point to converge quickly to the vicinity of the desired operating point.

In any one of the above-mentioned setting methods, more preferably, the quantity (predetermined quantity) of the offsetting of the virtual $NO_x$ concentration from the desired $NO_x$ concentration to the minus side is determined to increase in accordance with an increase in molar ratio. This makes the virtual $NO_x$ concentration decrease monotonically in accordance with an increase in molar ratio, and enables the adjustment quantity of the $NH_3$ injection rate to be set on the basis of the deviation between the virtual $NO_x$ concentration and the desired $NO_x$ concentration to be increased/decreased on the basis of the molar ratio, thereby enabling the operating point to converge quickly to the vicinity of the desired operating point.

In addition, it is also preferable that the quantity (predetermined quantity) of the offsetting from the desired $NO_x$ concentration to the minus side is made to adjustable variably. In this case, the leakage $NH_3$ quantity is small, and, at least, in a case in which the $NO_x$ concentration is merely controlled to below the desired $NO_x$ concentration, or for the reduction of the variation of the $NH_3$ injection rate, it is possible to meet these requirements by setting the aforesaid predetermined quantity to zero.

Still additionally, it is preferable that the gain of the feedback control is made to vary in accordance with the magnitude of the molar ratio, or that it is made to vary in accordance with the temperature of an exhaust gas coming into an $NO_x$ removal apparatus. The chemical reactions on the right and left sides with respect to a characteristic curve differ greatly from each other to cause a large variation in time constant, and the reaction rate of an $NO_x$ removal apparatus varies largely in accordance with temperature; therefore, if the gain of the feedback control is changed in accordance with the molar ratio or the exhaust gas temperature, it is possible to make the operating point converge quickly to the vicinity of the desired operating point.

Yet additionally, it is also preferable that the minimum point is changed in accordance with the temperature of an exhaust gas coming into the $NO_x$ removal apparatus. Since the characteristic curve varies with a temperature of an exhaust gas and the $NH_3$ injection rate and the $NO_x$ concentration corresponding to the minimum point also vary accordingly, if the minimum point is changed in accordance with the exhaust gas temperature in this way, it is possible to implement more-accurate feedback control for suppressing the $NO_x$ concentration to below the desired $NO_x$ concentration with a minimum $NH_3$ injection rate.

The above-described $NH_3$ injection rate control method can be achieved through the use of a control unit with the following arrangement. This control unit is an $NH_3$ injection rate control unit for an $NO_x$ removal apparatus in which the correlation between a molar ratio of an $NH_3$ injection rate into the $NO_x$ removal apparatus with respect to an $NO_x$ flow rate at an inlet of the $NO_x$ removal apparatus and the $NO_x$ concentration at an outlet of the $NO_x$ removal apparatus shows a downwardly protrusive V-shaped characteristic curve on a plane in which a molar ratio and an $NO_x$ concentration are expressed as X-Y coordinates, and is made up of an $NO_x$ concentration detecting means for detecting an $NO_x$ concentration at the outlet of the $NO_x$ removal apparatus, a desired $NO_x$ concentration setting means for setting a desired $NO_x$ concentration at the outlet of the $NO_x$ removal apparatus, an $NO_x$ flow rate detecting means for detecting an $NO_x$ flow rate at the inlet of the $NO_x$ removal apparatus, an $NH_3$ injection rate adjusting means for adjusting an $NH_3$ injection rate into the $NO_x$ removal apparatus, a virtual $NO_x$ concentration setting means, and a feedback control means.

The virtual $NO_x$ concentration setting means has a function to, when an operating area of an $NO_x$ removal apparatus is divided into a first area in which the molar ratio is lower than a molar ratio at a minimum point where the $NO_x$ concentration assumes a minimum value and a second area other than the first area, set a virtual $NO_x$ concentration with respect to a molar ratio according to a virtual characteristic line varying monotonically without rising with respect to an increase in molar ratio when the operating point of the $NO_x$ removal apparatus shifts from the first area to the second area. The feedback control means has a function to adjust the $NH_3$ injection rate with respect to an $NO_x$ flow rate on the basis of a deviation between the desired $NO_x$ concentration and the virtual $NO_x$ concentration in a direction that the virtual $NO_x$ concentration is brought close to the desired $NO_x$ concentration.

With this control unit, the aforesaid $NH_3$ injection rate control method can be realized by the automatic control based on the cooperation among the $NO_x$ concentration detecting means, the desired $NO_x$ concentration setting means, the $NO_x$ flow rate detecting means, the $NH_3$ injection rate adjusting means, the virtual $NO_x$ concentration setting means and the feedback control means. In this connection, the control unit can also be realized by reading a program which makes a computer being hardware function as the $NO_x$ concentration detecting means, the desired $NO_x$ concentration setting means, the $NO_x$ flow rate detecting means, the $NH_3$ injection rate adjusting means, the virtual $NO_x$ concentration setting means and the feedback control means. This program can be provided in a state stored in a computer-readable recording medium.

DESCRIPTION OF THE PREFERRED EMBODIMENTS

An embodiment of the present invention will be described hereinbelow with reference to the drawings.

Figure 1:
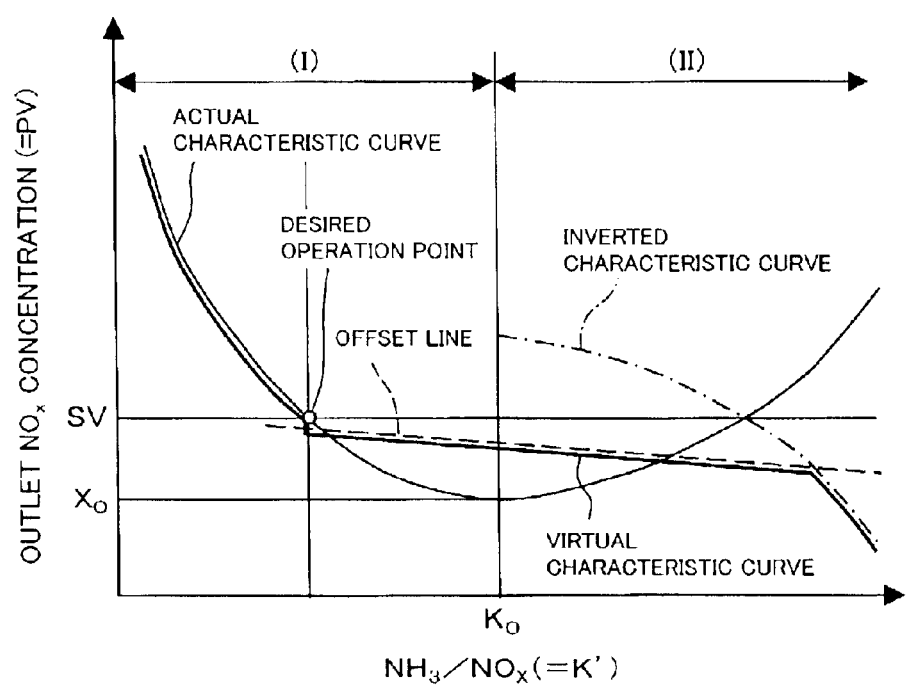
FIG. 1 is a graph showing a static characteristic of an $NO_x$ removal apparatus to which the present invention is applicable.

FIG. 1 is a graph useful for explaining an NH$_3$ injection rate control method for use in an NO$_x$ removal apparatus according to an embodiment of the present invention. The graph of FIG. 1 shows a static characteristic of the an NO$_x$ removal apparatus, where the horizontal axis depicts a molar ratio (NH$_3$/NO$_x$ molar ratio=K') of an NH$_3$ injection rate into the NO$_x$ removal apparatus with respect to an NO$_x$ flow rate at an inlet of the NO$_x$ removal apparatus while the vertical axis denotes an NO$_x$ concentration at an outlet of the NO$_x$ removal apparatus. The static characteristic of the NO$_x$ removal apparatus according to this embodiment shows a downwardly protrusive V-shaped characteristic as indicated by a solid line in the illustration, and an operating point where the NH$_3$/NO$_x$ molar ratio=K$_0$ and the outlet NO$_x$ concentration=X$_0$ is taken as a minimum point.

When a desired outlet NO$_x$ concentration is taken as SV, two operating points at which the outlet NO$_x$ concentration assumes SV appear on the characteristic curve. Of these operating points, the operating point existing on the left side of the minimum point can minimize the NH$_3$ injection rate, and this operating point is handled as a desired operating point. A description will be given hereinbelow of an NH$_3$ injection rate control method for making the operating point of the NO$_x$ removal apparatus converge to the vicinity of the desired operating point.

First of all, an operating area of an NO$_x$ removal apparatus is divided into two areas (I) and (II). In each of these areas (I) and (II), a process value (actual NO$_x$ concentration) PV of the actual outlet NO$_x$ concentration is converted into a virtual process value (virtual NO$_x$ concentration) PV'. The equation for the conversion of the actual NO$_x$ concentration PV in each of the areas (I) and (II) into the virtual NO$_x$ concentration PV' is as follows.

Area (I): K'<K$_0$ $$PV' = \max\{SV - S_0(K'), PV\} \quad (1)$$

Area (II): K'≧K$_0$ $$PV' = \min\{SV - S_0(K'), SV - (PV - SV)\} \quad (2)$$

The conversion equation for each of the areas (I) and (II) is for virtually converting a characteristic curve varying to draw a V-shaped configuration into a curve declining (decreasing) monotonically. As FIG. 1 shows, the area (I) is positioned on the left side of the minimum point, and in this area (I), the actual characteristic curve declines monotonically. This area (I) is equivalent to the first area in the present invention.

The area (II) corresponds to the second area in the present invention. In the area (II), conversely, the actual characteristic curve rises (increases) monotonically after going over the minimum point. Thus, theoretically, it can be considered that only in the right-side area (II) of the minimum point which shows a monotonic rise, the actual characteristic curve is virtually converted into a curve which declines monotonically. However, although the coordinates (K$_0$, X$_0$) at the minimum point can be obtained through design data or actual measurements, they are only reference values under given operating conditions, and there is a possibility that the minimum point shifts from the actual minimum point. For this reason, if the conversion of the characteristic curve is made on reaching the minimum point, when a difference exists between the expected minimum point and the actual minimum point, particularly, when the actual minimum point is positioned on the left side with respect to the expected minimum point, a monotonically rising area still remains partially after the conversion.

Therefore, in this embodiment, as indicated by a broken line in FIG. 1, a line offset by a predetermined quantity S$_0$ (K') to the minus side with respect to the desired outlet NO$_x$ concentration SV is drawn, and the virtual NO$_x$ concentration PV' is positioned on this offset line [see equations (1) and (2)], where S$_0$ (K') signifies a SV offset function, and a function increasing monotonically with respect to an increase in NH$_3$/NO$_x$ molar ratio K'. That is, in the area (I), the actual characteristic curve and the offset line are compared with each other so that the virtual NO$_x$ concentration PV' is positioned on the higher one thereof {see equation (1)}. On the other hand, in the area (II), an inverted characteristic curve (line indicated by a chain line in FIG. 1) of the actual characteristic curve with respect to the desired outlet NO$_x$ concentration SV is compared with the offset line so that the virtual NO$_x$ concentration PV' is positioned on the lower one thereof {see equation (2)}. When the virtual NO$_x$ concentration PV' is set in this way, the minimum point is simply required to exist at least in a range of SV>PV, and in this case, even if an error occurs between the expected minimum point and the actual minimum point, there is no influence on the virtual characteristic curve. Therefore, the virtual characteristic curve to be used in this embodiment results in a curve indicated by a bold solid line in FIG. 1.

When the feedback control is implemented using this virtual characteristic curve, if the operating point is on the left side of the desired operating point, the virtual NO$_x$ concentration PV' is larger than the desired NO$_x$ concentration SV and, hence, the NH$_3$ injection rate is adjusted in an increasing direction. Thus, the operating point moves to the right side along the actual characteristic curve to restrain the actual NO$_x$ concentration PV. When the operating point exists on the right side of the desired operating point, the virtual NO$_x$ concentration PV' is smaller than the desired NO$_x$ concentration SV and, hence, the NH$_3$ injection rate is adjusted in a decreasing direction. Thus, the operating point moves to the left side along the actual characteristic curve to restrain the NH$_3$ injection rate. In particular, if the operating point is largely shifted from the desired operating point to the right side, the virtual NO$_x$ concentration PV' is positioned on the inverted characteristic curve declining with respect to an increase in K', and this increases the deviation between the desired NO$_x$ concentration SV and the virtual NO$_x$ concentration PV'. Accordingly, the adjustment quantity for the decrease of NH$_3$ injection rate to be set in accordance with the deviation there between becomes larger, thereby achieving quick convergence of the operating point to the vicinity of the desired operating point. Incidentally, although S$_0$ (K') can be a monotonically increasing function as mentioned above, it is preferable that this function is made to be a monotonically increasing function which enlarges the deviation between the desired NO$_x$ concentration SV and the virtual NO$_x$ concentration PV' in accordance with an increase in K'. Thus, when S$_0$ (K') is taken as such a monotonically increasing function, the adjustment quantity for the decrease of the NH$_3$ injection rate to be set in accordance with the deviation therebetween can be increased with an increase in K', thereby achieving the quick convergence of the operating point to the vicinity of the desired operating point.

Secondly, referring to FIGS. 2 and 3, a description will be given hereinbelow of an $NH_3$ injection rate control unit of an $NO_x$ removal apparatus according to this embodiment. The $NH_3$ injection rate control unit according to this embodiment is constructed in a manner that a computer being hardware reads a program produced on the basis of a control logic which will be described hereinbelow. The $NH_3$ injection rate control unit according to this embodiment employs an $NH_3$ injection rate control method forming a combination of the feedforward control and the feedback control, as in the case of the conventional technique, and the control logic can be described in a state divided into a control logic for the feedforward control shown in the block diagram of FIG. 2 and a control logic for the feedback control shown in the block diagram of FIG. 3. The $NH_3$ injection rate control method according to the present invention described with reference to FIG. 1 is applicable to the control logic for the feedback control shown in FIG. 3.

First, referring to FIG. 2, a description will be given hereinbelow of the control logic for the feedforward control. For this control, an exhaust gas flow rate 250, an exhaust gas $NO_x$ concentration 251 and an exhaust gas temperature 252 are detected by detectors 101, 102 and 103 at a plant being in a running condition. the detected exhaust gas flow rate 250 and exhaust gas $NO_x$ concentration 251 are multiplied in a multiplier 106 after noise removal in first order delay filters 104 and 105. The exhaust gas flow rate 250 is multiplied by the exhaust gas $NO_x$ concentration 251 to calculate a signal 201 corresponding to an $NO_x$ flow rate at an inlet of the $NO_x$ removal apparatus. The calculated the inlet $NO_x$ flow rate corresponding signal 201 is differentiated by a differentiator 107 to derive a differential advance signal 202. This differential advance signal 202 is an advance signal for compensating for time lag of the control at a load variation, and is added (only in the case of positive) to the inlet $NO_x$ flow rate corresponding signal 201 in an adder 108 to calculate an inlet $NO_x$ flow rate corresponding signal 203 including as differential advance signal. This inlet $NO_x$ flow rate corresponding signal 203 is multiplied by a unit-conversion coefficient 109 in multiplier 110 to calculate an inlet $NO_x$ flow rate 204. The above-mentioned control logic corresponds to the $NO_x$ flow rate detecting means of the $NH_3$ injection rate control unit according to the present invention. Moreover, the inlet $NO_x$ flow rate 204 is multiplied by a stoichiometric conversion coefficient 119 in a multiplier, thereby calculating an $NH_3$ injection rate feedforward component 213.

Figure 6:
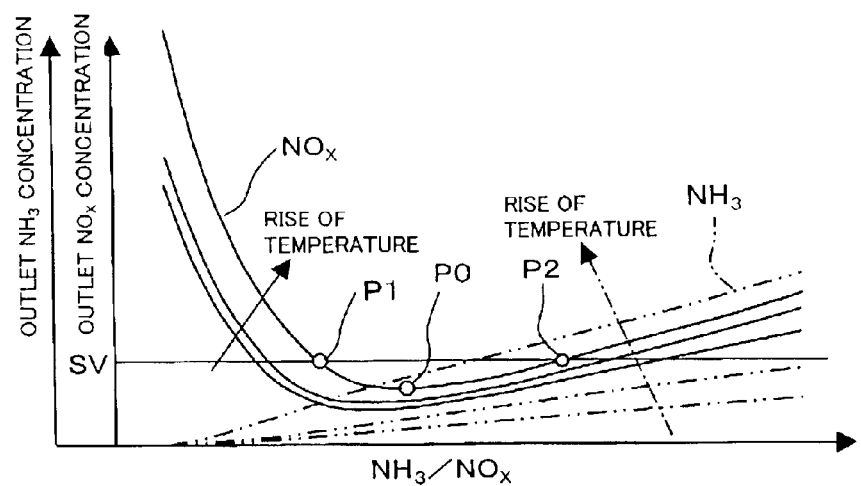
FIG. 6 is an illustration of the relationship between an $NH_3/NO_x$ molar ratio and an outlet $NO_x$ concentration in an NO$_x$ removal apparatus having a downwardly protrusive V-shaped static characteristic and the relationship between NH$_3$/NO$_x$ molar ratio and a leakage NH$_3$ quantity.

On the other hand, the exhaust gas temperature 252 detected by the detector 103 is collated with a conversion map 111 to be converted into a molar ratio 205 at the minimum point corresponding to the exhaust gas temperature. The molar ratio at the minimum point is a molar ratio ($NH_3/NO_x$ molar ratio) which minimizes the outlet $NO_x$ concentration under the condition of the detected exhaust gas temperature, and the relationship between the exhaust gas temperature and the molar ratio at the minimum point is obtained previously through experiments, design calculations or the like. An adjustment bias 112 is added to the obtained molar ratio 205 at the minimum point in an adder 113. This adjustment bias 112 is a correction value, for example, for compensating for the difference between the actual use and the design calculation. A molar ratio ($K_0$) 206 obtained by the addition correction of the adjustment bias 112 becomes a reference value for setting the $NH_3$ injection rate. As FIG. 6 shows, the characteristic curve varies with the exhaust gas temperature and the molar ratio corresponding to them in minimum point varies accordingly; therefore, if the reference molar ratio ($K_0$) 206 is set to vary in accordance with the exhaust gas temperature 252, it is possible to enhance the control accuracy.

A set value 209 of the $NH_3$ injection rate can be obtained by multiplying a required molar ratio (K) 208 obtained by adding a feedback component 207, which will be mentioned later, to the reference molar ratio ($K_0$) 206 by the aforesaid $NH_3$ feedforward component 213 in a multiplier 115. The obtained $NH_3$ injection rate set value 209, together with an $NH_3$ injection rate 210 measured by a flowmeter 118, is inputted to a PI controller 116. The PI controller 116 calculates an adjustment quantity 211 for a flow rate control valve 117 through the use of proportional integral control based on a deviation between the $NH_3$ injection rate set value 209 and the $NH_3$ injection rate 210 at the present. The flow rate control valve 117 controls the $NH_3$ injection rate 210 on the basis of the adjustment quantity 211 inputted from the PI controller 116. In this embodiment, these PI controller 116 and flow rate control valve 117 constitute the $NH_3$ injection rate adjusting means for the $NH_3$ injection rate control unit according to the present invention.

Furthermore, referring to FIG. 3, a description will be given hereinbelow of the control logic of the feedback control. For this control, an $NO_x$ concentration (PV) at an outlet of an $NO_x$ removal apparatus is detected by a detector ($NO_x$ concentration detecting means) 121 in the $NO_x$ removal apparatus. Moreover, a desired $NO_x$ concentration (SV) at the outlet of the $NO_x$ removal apparatus is inputted through an input device (desired $NO_x$ concentration setting means) 122. A desired $NO_x$ concentration 222 and an outlet $NO_x$ concentration 221 are compared with each other in a comparator 123 to make a calculation for a comparison signal (SV−PV) 223. The comparison signal 223 from the comparator 123 and the desired $NO_x$ concentration 222 are inputted to an adder 125, and an inverted value (SV−PV+ SV) of the outlet $NO_x$ concentration 221 forming the addition value is inputted as a virtual output $NO_x$ concentration 224 to a lower-value selector 126.

The outlet $NO_x$ concentration 221 and the virtual outlet $NO_x$ concentration 227 are inputted to a higher-value selector 127. This virtual outlet $NO_x$ concentration 227 is a value obtained by subtracting an offset value $\{S_0 (K')\}$ 226 from the desired $NO_x$ concentration 222 in a comparator 129, and the offset value 226 can be obtained by collating a molar ratio (K') 240 with a conversion map 131. In the conversion map 131, the offset value 226 is set to increase monotonically with the molar ratio (K') 240.

In this connection, the molar ratio 240 can be calculated in a manner that, after the noise removal of an inlet $NO_x$ flow rate 204 and an $NH_3$ injection rate 210 in first order delay filters 133 and 134, the $NH_3$ injection rate 210 is divided by the input $NO_x$ flow rate 204 (K'=$NH_3/NO_x$) in a divider 135. Moreover, the calculated molar ratio 240 is inputted to a comparator 136. In the comparator 136, the molar ratio 240 is compared with a reference molar ratio 206, and the resultant comparison signal (K'−$K_0$) 241 is inputted to a decision device 137.

The higher-value selector 127 is made to select a larger one of two inputs for outputting it. In this case, when the virtual outlet $NO_x$ concentration 227 is equal to or higher than the outlet $NO_x$ concentration 221, the outlet $NO_x$ concentration (PV) 221 is selected. On the other hand, when the virtual outlet $NO_x$ concentration 227 is below the outlet $NO_x$ concentration 221, the virtual outlet $NO_x$ concentration $\{SV−S_0 (K')\}$ 227 is selected and outputted.

The lower-value selector 126 is made to select a smaller one of two inputs for outputting it. In this case, the virtual outlet $NO_x$ concentration (SV−PV+SV) 224 and the virtual outlet $NO_x$ concentration {SV−$S_0$ (K')} 227 are inputted to the lower-value selector 126 so that the smaller virtual outlet $NO_x$ concentration is selected to be inputted to a change-over switch 128.

The change-over switch 128 selects one of two inputs, that is, a selection signal 228 from the lower-value selector 126 and a selection signal 229 from the higher-value selector 127, on the basis of the decision result in the decision device 137 and outputs it to a rate-of-change limiter 138. The decision device 137 makes a decision as to whether or not the comparison signal 241 is more than zero, that is, whether or not the molar ratio (K') 240 is equal to or larger than the reference molar ratio ($K_0$) 206. In a case in which the molar ratio 240 is less than the reference molar ratio 206, the change-over switch 128 selects the selection signal 229 from the higher-value selector 127, and if the molar ratio 240 is equal to or more than the reference molar ratio 206, it selects the selection signal 228 from the selector 126.

As a result, a selection signal 230 outputted from the change-over switch 128 becomes the greater one of the outlet $NO_x$ concentration (PV) 221 and the virtual outlet $NO_x$ concentration {SV−$S_0$ (K')} 227 when the molar ratio (K') 240 is lower than the reference molar ratio ($K_0$) 206. On the other hand, it becomes the smaller one of the virtual outlet $NO_x$ concentration (SV−PV+SV) 224 and the virtual outlet $NO_x$ concentration {SV−$S_0$ (K')} 227 when the molar ratio (K') 240 is equal to or higher than the reference molar ratio ($K_0$) 206. The above-described control logic corresponds to the virtual $NO_x$ concentration setting means of the $NH_3$ injection rate control unit according to the present invention.

The selection signal 230 from the change-over switch 128 is limited in rate of change in the rate-of-change limiter 138 and then inputted as a controlled variable (PV') 231 to a PI controller (feedback control means) 139. The PI controller 139 is made to calculate a feedback controlled variable (MV) 232 through the use of proportional integral control based on a deviation between the desired $NO_x$ concentration (SV) 222 and the controlled variable (PV') 231. The calculated feedback controlled variable 232 is converted through a conversion map 140 into a feedback component 207 of the molar ratio and is added to the reference molar ratio ($K_0$) 206 in an adder 114.

In this connection, in this embodiment, a proportional gain ($k_p$) 245 of the PI controller 139 is adjusted in accordance with an exhaust gas temperature or a molar ratio. Concretely, a reference proportional gain ($k_{p0}$) 145 at a predetermined reference temperature is determined, and this reference proportional gain ($k_{p0}$) 145 is multiplied by a temperature handling correction gain 246 and a molar ratio handling correction gain 247 through the use of multipliers 143 and 144, thereby calculating the proportional gain ($k_p$) 245. the temperature handling correction gain 246 is stored in a conversion map 141 in a state associated with a exhaust gas temperature 252, and the molar ratio handling correction gain 247 is stored in a conversion map 142 in a state associated with a deviation between the molar ratio (K') 240 and the reference molar ratio ($K_0$) 206. Since the chemical reactions differ from each other between the right and left sides of the characteristic curve, the time constant varies largely, and the reaction rate of the $NO_x$ removal apparatus also varies largely in accordance with the exhaust gas temperature. Thus, if the proportional gain ($k_p$) 245 of the feedback control is changed in accordance with the molar ratio or the exhaust gas, it is possible to achieve quick convergence of the operating point to the vicinity of the desired operating point.

Figure 2:
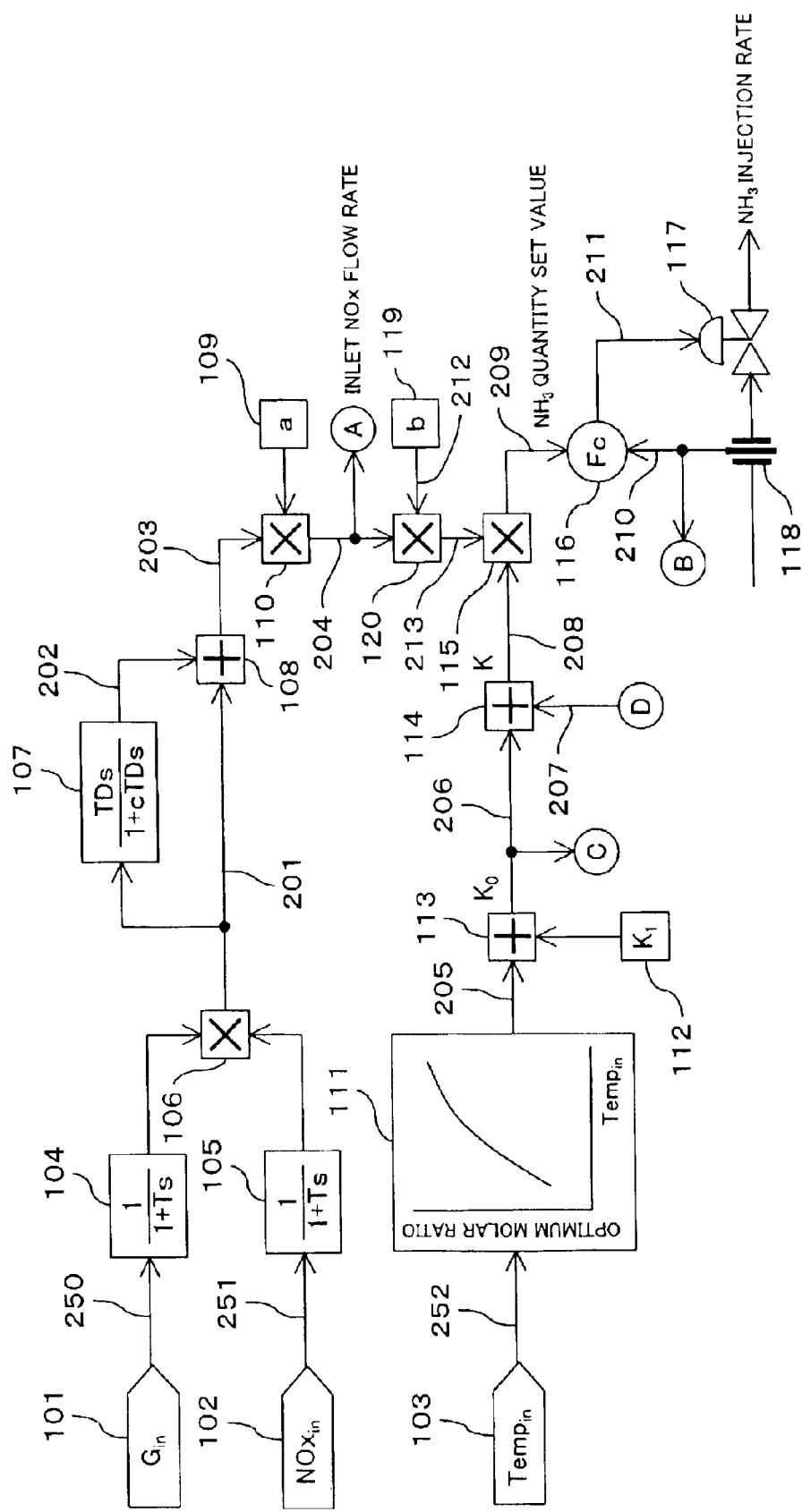
FIG. 2 is a block diagram showing a control logic of feedforward control.
Figure 3:
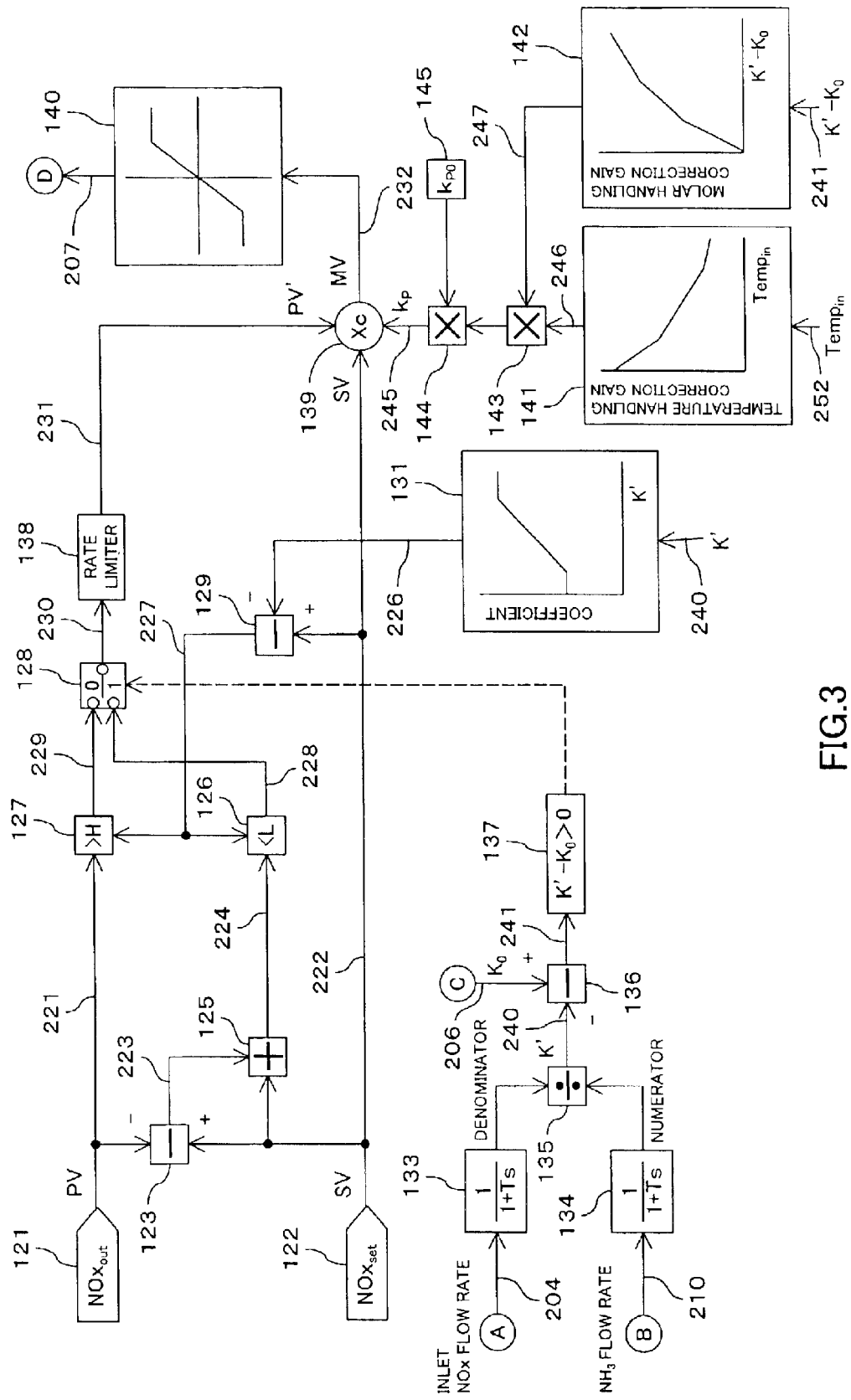
FIG. 3 is a block diagram showing a control logic of feedback control.
Figure 4:
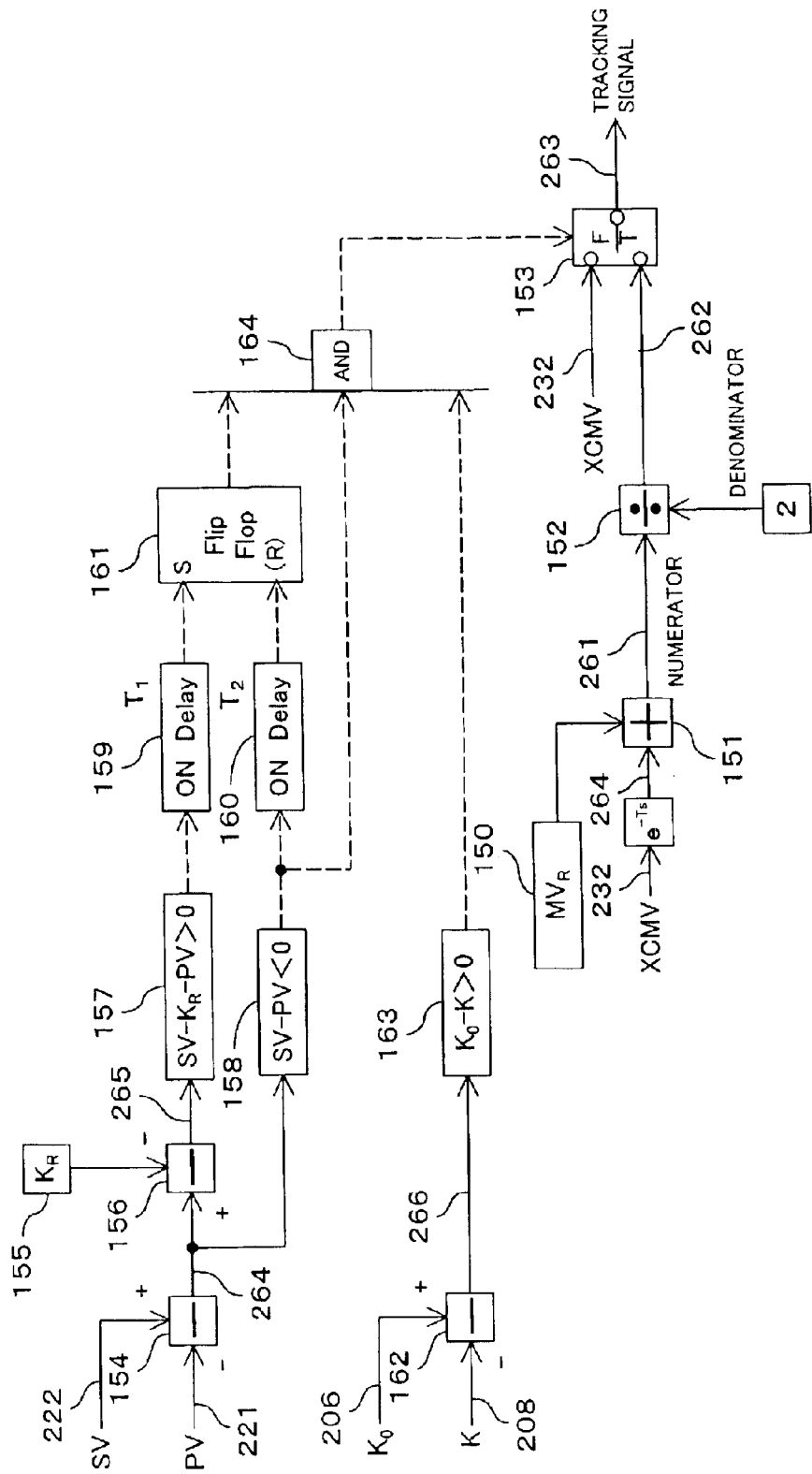
FIG. 4 is a block diagram showing a control logic of overshoot prevention control.

Although the control logic of the control unit for the $NO_x$ removal apparatus according to this embodiment has been described above, it is also appropriate that a process based on a control logic shown in FIG. 4 is applied to an adjustment quantity 232 to be calculated in the PI controller 116 shown in FIG. 2. This control logic is for preventing the occurrence of an overshoot by which an outlet $NO_x$ concentration (PV) largely exceeds a desired $NO_x$ concentration (SV) after a long continuation of a state in which the outlet $NO_x$ concentration (PV) is considerably lower than the desired $NO_x$ concentration (SV).

As mentioned above, since the chemical reactions greatly differ from each other between the right and left sides of a characteristic curve, the time constant varies largely, and as the characteristic curve goes to the right side, that is, as the molar ratio becomes higher, the reaction rate becomes lower. For this reason, if the operating point exists on the right side of the desired operating point, the feedback control is implemented to decrease the $NH_3$ injection rate. However, the outlet $NO_x$ concentration (PV) does not vary soon in spite of the decrease in $NH_3$ injection rate. Therefore, in a case in which a state that the operating point is on the right side with respect to the desired operating point continues for a long time, the $NH_3$ injection rate is excessively adjusted in a decreasing direction. Following this, the influence thereof occurs after delay, and the outlet $NO_x$ concentration (PV) increases to considerably exceed the desired $NO_x$ concentration (SV), which can cause an overshoot. The occurrence of such an overshoot not only discharges $NO_x$ exceeding the desired concentration but also delays the convergence of the operating point to the desired operating point.

For this reason, in the control logic shown in FIG. 4, in a case in which the $NO_x$ concentration approaches the desired $NO_x$ concentration after a state in which the outlet $NO_x$ concentration (PV) is considerably lower than the desired $NO_x$ concentration (SV) continues for a long time, the adjustment quantity of the $NH_3$ injection rate is temporarily increased to prevent the $NH_3$ injection rate from being excessively adjusted in the decreasing direction. Concretely, a signal 264 obtained by delaying an adjustment quantity (XCMV) 232 by one control cycle is added to a predetermined correction adjustment quantity ($MV_R$) 150 in an adder 151, and the resultant addition value 261 is divided by 2 in a divider 152 to obtain an average value {(XCMV+MVR)/2} 262. One of this average value 262 and an adjustment quantity 211 is selected by a switch 153 to be outputted as a tracking signal 263 to an PI controller 139. Incidentally, the correction adjustment quantity 150 is set to be somewhat larger than the adjustment quantity 232. Therefore, when the switch 153 selects the average value 262, the adjustment quantity of the $NH_3$ injection rate is set to be slightly larger than ordinary.

The switching operation of the switch 153 is made to be conducted in accordance with a signal from an AND circuit 164. That is, if the AND condition for the AND circuit 164 reaches satisfaction, the switch 153 selects the average value 262 as the tracking signal 263, otherwise, it selects the adjustment quantity 211.

The AND condition for the AND circuit 164 is satisfied when the following three conditions reach satisfaction. The first condition is that a delay timer 159 is in the on state. The delay timer 159 measures the time elapsed from the conclusion of the decision in a decision device 157, and turns on after an elapse of a predetermined period of time T1. The decision device 157 makes a decision as to whether or not a value (SV-$K_R$-PV) 265 obtained by subtracting the outlet $NO_x$ concentration (PV) 221 and a threshold (KR) from the desired $NO_x$ concentration (SV) 222 is larger than zero. The second condition is the conclusion of the decision in a decision device 158. The decision device 158 makes a decision as to whether or not a value (SV-PV) 264 obtained by subtracting the outlet $NO_x$ concentration (PV) 221 from a desired $NO_x$ concentration (SV) 222 calculated in a comparator 154 is larger than zero. Moreover, the third condition is the conclusion of the decision in a decision device 163. The decision device 163 makes a decision as to whether or not a value ($K_0$ -k) 266 obtained by subtracting a required molar ratio (K) 208 from a reference molar ratio ($K_0$) calculated in a comparator 162 is larger than zero. The above-mentioned three conditions signify that, after a state (PV<SV-$K_R$) in which the outlet $NO_x$ concentration (PV) is considerably lower than the desired $NO_x$ concentration (SV) continues for a long time, the operating point lies on the left side of the minimum point and the outlet $NO_x$ concentration (PV) exceeds the desired $NO_x$ concentration (SV).

The AND condition for the AND circuit 164 is canceled when the output of a flip-flop 161 turns off. In the flip-flop 161, a signal from the delay timer 159 is inputted to its set terminal while a signal from a delay timer 160 is inputted to its reset terminal. The delay timer 160 measures the time after the conclusion of the decision in the decision device 158, and turns on after an elapse of a predetermined period of time $T_2$ (corresponding to one control cycle). When the delay timer 160 turns on, an output signal of the flip-flop 161 is reset to the off state. Thus, the adjustment of the $NH_3$ injection rate is accomplished on the basis of the ordinary adjustment quantity 232.

Although the description has been given above of the embodiment of the present invention, the invention is not limited to this. For example, the control logic shown in FIGS. 2 to 4 are only examples of control logic for an $NH_3$ injection rate control method according to the invention being implemented in a control unit. Accordingly, naturally, it is possible to employ other control logic provided that the $NH_3$ injection rate control method according to the invention can be applied thereto.

In addition, although in this embodiment the characteristic line expressed by the functions of the equations (1) and (2) is used as the virtual characteristic line for setting virtual $NO_x$ concentration, as the virtual characteristic line, any one of characteristic lines which shows a lower $NO_x$ concentration than a desired $NO_x$ concentration and declines monotonically with respect to an increase in molar ratio is also acceptable. Such characteristic lines can determine a desired operating point univocally.

Still additionally, a feedback control method employing the $NH_3$ injection rate control method according to the present invention is not limited to only an $NH_3$ injection rate control method for use in an $NO_x$ removal apparatus. That is, in a V-shaped characteristic system in which the correlation between input and output values shows a V-shaped characteristic curve having one minimum point on a plane where the input and output valves are expressed in the form of X-Y coordinates, the feedback control for bringing an output value close to an desired output value is applicable irrespective of applications.

Figure 5A:
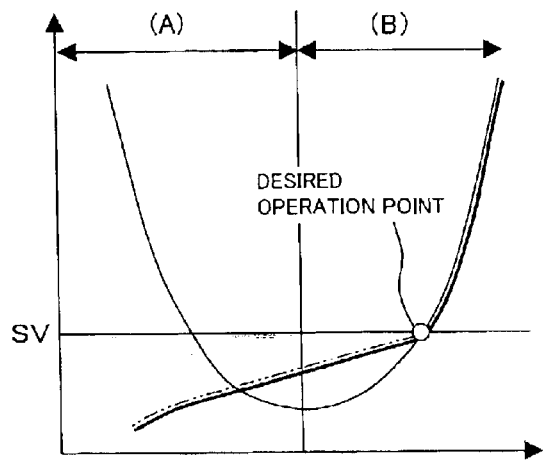
FIGS. 5A, 5B and 5C are illustrations of others application examples of a feedback control method to be used in the present invention.

Thus, in a system showing a downwardly protrusive V-shaped characteristic curve as indicated by a solid line in FIG. 5A, when an operating point is converged to a desired operating point existing on the right side of a minimum point, a virtual output value to an input value is set according to a virtual characteristic line (indicated by a bold solid line) which varies monotonically so that the inclination of an output value to an input value in an area (B) in the illustration and the inclination of an out put value to an input value in an area (A) in the same illustration do not differ in sign from each other, that is, which rises monotomically to stride across the desired operating point from the area (A) to the area (B), and the input value is changed in accordance with a deviation between a desired output value (SV) and the virtual output value in a direction that the virtual output value is brought close to the desired output value. In this case, the characteristic curve lying on the right side of the desired operating point is replaced with a monotonically rising curve (indicated by a two-dot chain line).

Furthermore, in a V-shaped characteristic system in which the correlation between input and output values shows a V-shaped characteristic curve having one maximum value on a plane where input and output values are expressed in the form of X-Y coordinates, the present invention is also applicable to a feedback control method for bringing an output value close to a desired output value.

Figure 5B:
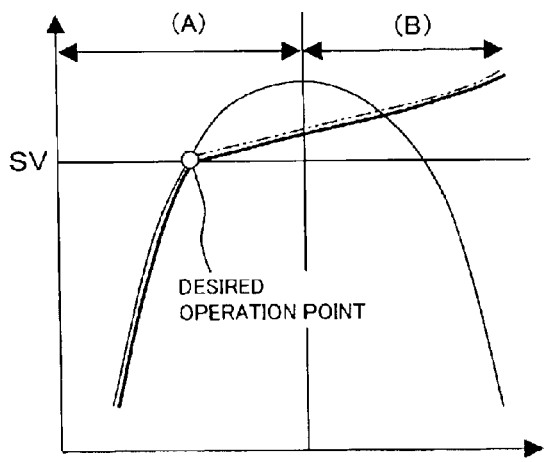

For example, in a system showing an upwardly protrusive V-shaped characteristic curve indicated by a solid line in FIG. 5B, when an operating point is converged to a desired operating point lying on the left side of a maximum point, a virtual output value to an input value is set according to a virtual characteristic line (indicated by a bold solid line) which varies monotonically to stride across the desired operating point so that the inclination of an output value to an input value in an area (A) in the illustration and the inclination of an output value to an input value in an area (B) in the same illustration do not differ in sign from each other, that is, which rises monotonically from the area (A) to the area (B), and an input value is changed in accordance with a deviation between a desired output value (SV) and the virtual output value in a direction that the virtual output value is brought close to the desired output value. In this case, the characteristic curve lying on the right side of the desired operating point is replaced with a monotonically rising curve (indicated by a two-dot chain line).

Figure 5C:
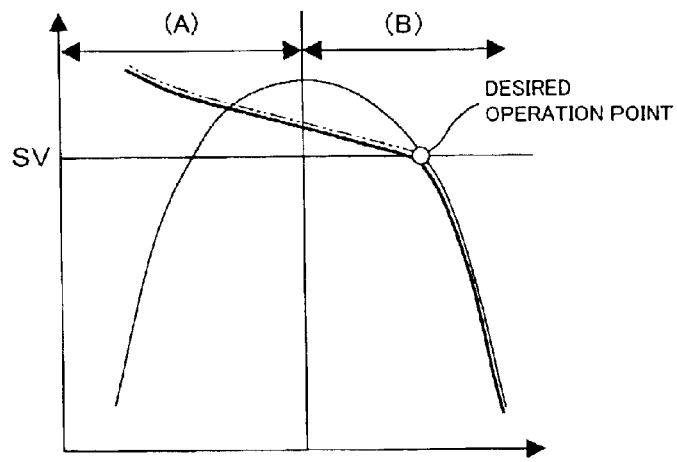

Still furthermore, in a system showing an upwardly protrusive V-shaped characteristic curve indicated by a solid line in FIG. 5C, when an operating point is converged to a desired operating point lying on the right side of a maximum point, a virtual output value to an input value is set according to a virtual characteristic line (indicated by a bold solid line) which varies monotonically to stride across the desired operating point so that the inclination of an output value to an input value in an area (A) in the illustration and the inclination of an output value to an input value in an area (B) in the same illustration do not differ in sign from each other, that is, which declines monotonically from the area (A) to the area (B), and an input value is changed in accordance with a deviation between a desired output value (SV) and the virtual output value in a direction that the virtual output value is brought close to the desired output value. In this case, the characteristic curve lying on the left side of the desired operating point is replaced with a monotonically declining curve (indicated by a two-dot chain line).

In any case, as indicated by the bold solid lines in FIGS. 5A, 5B and 5C, the feedback control can be executed according to a virtual characteristic curve having no inflection point and varying monotonically, thereby converging the operating point stably to the vicinity of a desired operating point.

What is claimed is:
1. An $NH_3$ injection rate control method for use in an $NO_x$ removal apparatus in which a correlation between a molar ratio of an $NH_3$ injection rate into said $NO_x$ removal apparatus with respect to an $NO_x$ flow rate at an inlet of said $NO_x$ removal apparatus and an $NO_x$ concentration at an outlet of said $NO_x$ removal apparatus shows a downwardly protrusive V-shaped characteristic curve on a plane where said molar ratio and said $NO_x$ concentration are expressed in the form of X-Y coordinates, said $NH_3$ injection rate control method for suppressing said $NO_x$ concentration to below a predetermined desired $NO_x$ concentration through the use of said $NH_3$ injection rate reaching a minimum comprising:

a step of, when an operating area of said $NO_x$ removal apparatus is divided into a first area in which said molar ratio is smaller than a molar ratio at a minimum point where said $NO_x$ concentration assumes a minimum value and a second area in which said molar ratio is equal to or larger than said minimum point molar ratio, setting a virtual $NO_x$ concentration with respect to said molar ratio according to a virtual characteristic line which varies monotonically to stride across a desired operating point without rising with an increase of said molar ratio from said first area to said second area; and a step of implementing feedback control for adjusting said $NH_3$ injection rate with respect to said $NO_x$ flow rate on the basis of a deviation between said desired $NO_x$ concentration and said virtual $NO_x$ concentration in a direction that said virtual $NO_x$ concentration is brought close to said desired $NO_x$ concentration.

2. An $NH_3$ injection rate control method for use in an $NO_x$ removal apparatus according to claim 1, wherein, in a right-hand area from said desired operation point, said virtual $NO_x$ concentration is set at a value obtained by offsetting by a predetermined quantity from said desired $NO_x$ concentration to a minus side.

3. An $NH_3$ injection rate control method for use in an $NO_x$ removal apparatus according to claim 1, wherein, in said first area, said virtual $NO_x$ concentration is set at a greater value of a value obtained by offsetting from said desired $NO_x$ concentration by a predetermined quantity to a minus side and an actual $NO_x$ concentration, and in said second area, said virtual $NO_x$ concentration is set at a smaller value of a value obtained by offsetting from said desired $NO_x$ concentration by said predetermined quantity to a minus side and an inverted value of said actual $NO_x$ concentration with respect to said desired $NO_x$ concentration.

4. An $NH_3$ injection rate control method for use in an $NO_x$ removal apparatus according to claim 2, wherein said predetermined quantity is increased in accordance with an increase of said molar ratio.

5. An $NH_3$ injection rate control method for use in an $NO_x$ removal apparatus according to claim 3, wherein said predetermined quantity is increased in accordance with an increase of said molar ratio.

6. An $NH_3$ injection rate control method for use in an $NO_x$ removal apparatus according to claim 2, wherein said predetermined quantity is made adjustable variably, and in a case in which a leakage $NH_3$ quantity is small and at least said $NO_x$ concentration is controlled to below said desired $NO_x$ concentration, or in a case in which a variation of said $NH_3$ injection rate is made smaller, said predetermined quantity is set at zero.

7. An $NH_3$ injection rate control method for use in an $NO_x$ removal apparatus according to claim 3, wherein said predetermined quantity is made adjustable variably, and in a case in which a leakage $NH_3$ quantity is small and at least said $NO_x$ concentration is controlled to below said desired $NO_x$ concentration, or in a case in which a variation of said $NH_3$ injection rate is made smaller, said predetermined quantity is set at zero.

8. An $NH_3$ injection rate control method for use in an $NO_x$ removal apparatus according to claim 1, wherein a gain of said feedback control is changed in accordance with a magnitude of said molar ratio.

9. An $NH_3$ injection rate control method for use in an $NO_x$ removal apparatus according to claim 1, wherein a gain of said feedback control is changed in accordance with a temperature of an exhaust gas flowing into said $NO_x$ removal apparatus.

10. An $NH_3$ injection rate control method for use in an $NO_x$ removal apparatus according to claim 1, wherein said minimum point is changed in accordance with a temperature of an exhaust gas flowing into said $NO_x$ removal apparatus on the basis of a characteristic of said $NO_x$ removal apparatus.

11. An $NH_3$ injection rate control unit for use in an $NO_x$ removal apparatus in which a correlation between a molar ratio of an $NH_3$ injection rate into said $NO_x$ removal apparatus with respect to an $NO_x$ flow rate at an inlet of said $NO_x$ removal apparatus and an $NO_x$ concentration at an outlet of said $NO_x$ removal apparatus shows a downwardly protrusive V-shaped characteristic curve on a plane where said molar ratio and said $NO_x$ concentration are expressed in the form of X-Y coordinates, said control unit comprising:

$NO_x$ concentration detecting means for detecting said $NO_x$ concentration at said outlet of said $NO_x$ removal apparatus;

desired $NO_x$ concentration setting means for setting a desired $NO_x$ concentration at said outlet of said $NO_x$ removal apparatus;

$NO_x$ flow rate detecting means for detecting said $NO_x$ flow rate at said inlet of said $NO_x$ removal apparatus;

$NH_3$ injection rate adjusting means for adjusting said $NH_3$ injection rate into said $NO_x$ removal apparatus;

virtual $NO_x$ concentration setting means for, when an operating area of said $NO_x$ removal apparatus is divided into a first area in which said molar ratio is smaller than a molar ratio at a minimum point where said $NO_x$ concentration assumes a minimum value and a second area in which said molar ratio is equal to or larger than said minimum point molar ratio, setting a virtual $NO_x$ concentration with respect to said molar ratio according to a virtual characteristic line which varies monotonically to stride across a desired operating point without rising with an increase of said molar ratio from said first area to said second area; and feedback control means for adjusting, through the use of said $NH_3$ injection rate adjusting means, said $NH_3$ injection rate on the basis of said $NO_x$ flow rate, detected by said $NO_x$ flow rate detecting means, in accordance with a deviation between said desired $NO_x$ concentration and said virtual $NO_x$ concentration, set by the virtual $NO_x$ concentration setting means, in a direction that said virtual $NO_x$ concentration is brought close to said desired $NO_x$ concentration.

12. A feedback control method for use in a V-shaped characteristic system in which a correlation between input and output values shows a V-shaped characteristic curve having one minimum point on a plane where said input and output values are expressed in the form of X-Y coordinates, said feedback control method for bringing said output value close to a desired output value, said control method comprising:

a step of, when an operating area of said system is divided into a first area in which a deviation between said input value and an input value at said minimum point has a specific sign and a second area having a sign different from said specific sign, setting a virtual output value with respect to said input value according to a virtual characteristic line which varies monotonically to stride across a desired operating point so that an inclination of said output value to said input value in said first area and an inclination of said output value to said input value in said second area do not have different signs; and a step of changing said input value on the basis of a deviation between said desired output value and said virtual output value in a direction that said virtual output value is brought close to said desired output value.

13. A control unit for use in a V-shaped characteristic system in which a correlation between input and output values shows a V-shaped characteristic curve having one minimum point on a plane where said input and output values are expressed in the form of X-Y coordinates, said control unit comprising:

detecting means for detecting said output value from said system;

desired out put value setting means for setting a desired output value;

inputting means for inputting said input value to said system;

virtual output value setting means for, when an operating area of said system is divided into a first area in which a deviation between said input value and an input value at said minimum point has a specific sign and a second area having a sign different from said specific sign, setting a virtual output value with respect to said input value according to a virtual characteristic line which varies monotonically to stride across a desired operating point so that an inclination of said output value to said input value in said first area and an inclination of said output value to said input value in said second area do not have different signs; and feedback control means for changing said input value on the basis of a deviation between said desired output value and said virtual output value in a direction that said virtual output value is brought close to said desired output value.

* * * * *